(12) United States Patent
Pfau

(10) Patent No.: US 11,767,869 B2
(45) Date of Patent: Sep. 26, 2023

(54) EXPANSIBLE FIXING PLUG

(71) Applicant: fischerwerke GmbH & Co. KG, Waldachtal (DE)

(72) Inventor: Patrick Pfau, Alpirsbach (DE)

(73) Assignee: fischerwerke Gmbh & Co. KG, Waldachtal (DE)

( * ) Notice: Subject to any disclaimer, the term of this patent is extended or adjusted under 35 U.S.C. 154(b) by 337 days.

(21) Appl. No.: 17/298,163

(22) PCT Filed: Dec. 2, 2019

(86) PCT No.: PCT/EP2019/083305
§ 371 (c)(1),
(2) Date: May 28, 2021

(87) PCT Pub. No.: WO2020/120196
PCT Pub. Date: Jun. 18, 2020

(65) Prior Publication Data
US 2022/0120305 A1    Apr. 21, 2022

(30) Foreign Application Priority Data
Dec. 13, 2018  (DE) ..................... 10 2018 132 029.9

(51) Int. Cl.
*F16B 13/06*        (2006.01)
(52) U.S. Cl.
CPC .......... F16B 13/061 (2013.01); F16B 13/066 (2013.01)
(58) Field of Classification Search
CPC ................. F16B 13/066; F16B 13/061; F16B 13/0808
USPC .............................. 411/39, 40, 55, 60.2, 60.3
See application file for complete search history.

(56) References Cited

U.S. PATENT DOCUMENTS

| | | | | |
|---|---|---|---|---|
| 1,929,743 A | * | 10/1933 | Jarvis ................... | B60B 33/0002 16/38 |
| 3,513,746 A | * | 5/1970 | Morgan ............... | F16B 13/0808 411/346 |
| 3,942,407 A | * | 3/1976 | Mortensen ............ | F16B 37/067 411/36 |
| 3,974,735 A | * | 8/1976 | Berner ................. | F16B 13/066 411/41 |

(Continued)

FOREIGN PATENT DOCUMENTS

| | | |
|---|---|---|
| AT | 501637 B1 | 10/2006 |
| DE | 2433294 A1 | 1/1976 |

(Continued)

OTHER PUBLICATIONS

International Search Report for corresponding Application No. PCT/EP2019/083305, dated Apr. 17, 2020.
English translation of the International Preliminary Report on Patentability for corresponding Application No. PCT/EP2019/083305, dated Jun. 8, 2021.

*Primary Examiner* — Flemming Saether
(74) *Attorney, Agent, or Firm* — Renner, Otto, Boisselle & Sklar, LLP

(57) ABSTRACT

An expansible fixing plug, having a sleeve-like portion, an expander body, and an expansion part which has expansion elements which, in a non-expanded state, are integrally joined to the sleeve-like portion and to the expander body. In addition, the expansion part has connecting elements which integrally join the sleeve-like portion and the expander body in the non-expanded state and also in the expanded state. The connecting elements are interlockingly connected to the expander body.

10 Claims, 1 Drawing Sheet

(56) References Cited

U.S. PATENT DOCUMENTS

| | | | | |
|---|---|---|---|---|
| 4,182,217 A | * | 1/1980 | Runge | F16B 13/061 411/35 |
| 4,284,378 A | * | 8/1981 | Mizusawa | F16B 37/043 411/21 |
| 4,309,136 A | * | 1/1982 | Talan | F16B 13/061 411/36 |
| 4,407,618 A | * | 10/1983 | Kimura | F16B 37/043 411/908 |
| 4,666,354 A | * | 5/1987 | Hepworth | F16B 13/066 411/40 |
| 6,676,348 B2 | * | 1/2004 | Hoppe | F16B 13/066 411/48 |
| 8,007,215 B2 | * | 8/2011 | Chen | F16B 13/061 411/26 |
| 8,579,568 B2 | | 11/2013 | Wenfeng | |

FOREIGN PATENT DOCUMENTS

| | | |
|---|---|---|
| DE | 2460431 A1 | 6/1976 |
| DE | 2558459 A1 | 7/1977 |
| DE | 3002525 A1 | 8/1980 |
| DE | 19720033 A1 | 11/1998 |
| DE | 69511329 T2 | 3/2000 |
| DE | 10134375 A1 | 1/2003 |
| DE | 10341950 A1 | 4/2005 |
| DE | 202006014383 U1 | 2/2008 |
| DE | 102011000537 A1 | 8/2011 |
| EP | 1277971 A1 | 1/2003 |
| EP | 1285173 B1 | 9/2004 |
| FR | 2611005 A1 | 8/1988 |
| JP | S5039661 U | 4/1975 |

\* cited by examiner

EXPANSIBLE FIXING PLUG

TECHNICAL FIELD

The invention relates to an expansible fixing plug.

DISCUSSION OF THE RELATED ART

German Offenlegungsschrift DE 25 58 459 A1 discloses a generic expansible fixing plug which has been produced in one piece from a plastics material. The expansible fixing plug is intended for fixing an add-on part to a board material behind which a cavity is located, as is typical of drywalls that have been covered with plasterboard panels. The known expansible fixing plug has at its front end an expander body which can be drawn rearwards using a screw to a sleeve-like collar, with the result that the expansion arms are spread apart and pressed against the rear side of the board material. The load-bearing characteristics of the known expansible fixing plug depend directly upon the force with which the screw presses the expander body against the expansion arms and upon how well the expansion arms are able to transmit that force to the body of the board.

SUMMARY OF THE INVENTION

The problem of the invention is to propose an expansible fixing plug the load-bearing characteristics of which are improved in comparison with the expansible fixing plug known from the prior art.

That problem is solved according to the invention by an expansible fixing plug as described herein. The expansible fixing plug according to the invention is used for fixing an add-on part to a fixing substrate, especially to a board material, especially a plasterboard panel. The expansible fixing plug extends along a longitudinal axis and can be circumscribed by a cylinder the height of which runs in the direction of the longitudinal axis and the base and top surfaces of which constitute the front and rear ends of the expansible fixing plug. "Front end" is here to be understood as being that end of the expansible fixing plug which is first inserted into the drilled hole when the expansible fixing plug is introduced into a drilled hole as intended. The expansible fixing plug has a sleeve-like portion, an expander body, and an expansion part which is arranged between the sleeve-like portion and the expander body. In particular, the expander body forms the front end of the expansible fixing plug. The expander body has especially a cylindrical basic shape with a rear portion that is conical or provided with sloping surfaces, which rear portion faces towards the expansion part or engages therein, whereas the sleeve-like portion can especially form the rear end of the expansible fixing plug. The sleeve-like portion especially has a collar and/or some other stop element which limits the extent to which the expansible fixing plug can be inserted into a drilled hole. The expansion part has at least two expansion elements which, in a non-expanded state, are integrally joined to the sleeve-like portion and to the expander body. In particular, the expansion elements are articulatedly connected to the sleeve-like portion, the connecting joints especially being formed by a local weakening of the material, for example by a groove running in a circumferential direction around the longitudinal axis of the expansible fixing plug. The "non-expanded state" is the state in which the expansible fixing plug is introduced into a drilled hole as intended, in which state the expander body is still integrally and securely joined to the expansion part, thus providing the expansible fixing plug with the stability necessary for being driven into a drilled hole.

The expansible fixing plug has a screw channel which runs centrally along or parallel to the longitudinal axis and into which an expander screw can be screwed. The longitudinal axis and the screw channel run parallel to the direction of introduction of the expansible fixing plug into a drilled hole. By means of the expander screw, the expander body can be moved relative to the expansion elements towards the sleeve-like portion, with the result that the expander body presses the expansion elements apart radially with respect to the longitudinal axis and enlarges the circumference of the expansion part, that is to say expands the expansion part. On expansion, the expansion elements become detached from the expander body at predetermined breaking points. In the non-expanded state the predetermined breaking points provide a secure connection between the expander body and the expansion elements, there being at least one predetermined breaking point between an expansion element and the expander body in each case. As a result of the connection via the predetermined breaking points, the expansible fixing plug has sufficient stability, especially stability against buckling or bending about an axis perpendicular to the longitudinal axis, so that the expansible fixing plug can also be introduced into a narrow drilled hole using a relatively large amount of axial pressure. On expansion, those predetermined breaking points are destroyed so that, in an expanded state, the expansion elements are separate from the expander body. As a result of being separated from the expander body the expansion elements are joined to the sleeve-like portion only at their rear ends. Accordingly, on expansion with the expander body the front ends of the expansion elements can be moved far apart and radially outwards using very little force and pressed against, for example, the rear side of a plasterboard panel to which the expansible fixing plug is being fixed.

If, to detach the add-on part from the fixing substrate, the expander screw is screwed out of the expansible fixing plug again, connecting elements prevent the expander body from being able to become detached from the other parts of the expansible fixing plug and, for example, falling into a cavity of the fixing substrate. The expansion part has at least two such connecting elements which integrally join the sleeve-like portion and the expander body both in the non-expanded state and in the expanded state. That is to say, unlike the expansion elements, even on expansion the connecting elements do not become separated from the expander body or from the sleeve-like portion to which they are directly or indirectly connected.

According to the invention, the connecting elements are interlockingly connected to the expander body. That is to say, a connecting element engages in the expander body with an interlocking element. The engagement is effected in a space that is delimited in a defined way and especially constitutes a negative image of the connecting element, resulting in a secure connection between the expander body and the connecting element that is inseparable during use as intended. In particular, there is a defined interface between the interlocking element and the expander body, which interface defines the transition from the interlocking element to the expander body. "Interlocking element" here refers to an element which especially engages in complementary recesses, openings or notches in the expander body in such a way that the interlocking element engages behind parts of the expander body, resulting in a tensile-resistant connection between the expander body and the connecting element, even in the absence of an additional bonded connection between the connecting element and the expander body.

The interlocking connection makes it possible to produce the expander body and/or the other parts of the expansible fixing plug separately and to join them together only after production of the expander body and/or the other parts. It is thereby possible to produce the expander body from a material that is more rigid than the material from which the connecting elements and/or the expansion elements are made, which elements are made, for example, from a material that is less brittle but tougher than that of the expander body but is less hard than the material from which the expander body is made.

Preferably the connecting elements, at their ends that face towards the expander body, each have at least one interlocking element which engages interlockingly in the expander body. It is also possible for a plurality of interlocking elements to be provided. Preferably the interlocking element is of wedge-like configuration, with a tip that faces away from the sleeve-like portion. "Wedge-like" especially includes a main body of the interlocking element which has an arrowhead, frustoconical, conical, frustopyramidal or pyramidal shape, or which generally has a triangular cross-section, the base surface of the main body forming the rear end of the interlocking element, that is to say facing towards the sleeve-like portion. That is to say, the rear end of the interlocking element, relative to a radial plane with respect to the longitudinal axis of the expansible fixing plug, has a larger cross-section than the front end of the interlocking element. In particular, the base surface runs in a radial plane with respect to the longitudinal axis of the expansible fixing plug, the base surface especially being concavely curved opposite the sleeve-like portion. An interlocking element so configured can readily be joined to the expander body and can activate a relatively large surface area in the expander body so that a sufficiently high tensile force can be transmitted between the interlocking element and the expander body which force prevents the expander body from becoming detached from the connecting elements when the expander screw is screwed out.

In a preferred embodiment of the expansible fixing plug according to the invention, the expander body consists of a first plastics material and the expansion part consists of a second plastics material. In particular, the expansible fixing plug according to the invention is produced from at least two plastics components in a multi-component injection-moulding process, thus enabling the expansible fixing plug to be produced in a simple, cost-effective way. In that process, in particular, first the expansion part is injection-moulded, especially together with the sleeve-like portion, and then the expander body is injection-moulded, the interlocking elements being at least partly interlockingly overmoulded with the plastics material of the expander body. In particular, the sleeve-like portion and the expansion part are made in one piece from the second plastics material.

In particular, the first plastics material, from which the expander body is made, is fibre-reinforced. "Fibre-reinforced" means here that reinforcing fibres are embedded in the plastics material matrix. Reinforcing fibres customarily used for plastics materials are especially glass fibres or carbon fibres, but the use of other fibres is not excluded within the scope of the invention. The use of the reinforcing fibres makes it possible to adjust the material characteristics of the expander body. In particular, as a result of the fibre reinforcement of the first plastics material the expander body is harder and has greater rigidity than the expansion part, which, however, is tougher and more easily deformable than the expander body, and can accordingly be better applied, i.e. adapted, to the rear side of a plasterboard panel, generally to the fixing substrate, for force transmission. However, a hard expander body is most suitable for pressing the expansion elements against the fixing substrate, where deformation of the expander body would be disadvantageous. An expansible fixing plug of such configuration therefore has very good expansion and load-bearing characteristics. In particular, the second plastics material is not fibre-reinforced.

It is further preferred that the first plastics material has substantially the same melting temperature as the second plastics material. "Substantially the same" means here that the melting temperatures are selected so that when, during injection-moulding, one of the plastics materials is injection-moulded onto the other plastics material, which is already solid, the injected plastics material starts to melt the plastics material which has previously been injected and is especially already solid, that is to say it causes the latter to become soft, at least locally and at least on the surface, so that the two plastics materials become joined together in such a way that a bonded connection is formed between the plastics materials. In particular, the melting temperatures are not more than 30 degrees Kelvin, especially not more than 20 degrees Kelvin, especially not more than 10 degrees Kelvin, apart.

Preferably both plastics materials are polyamides. In particular, the first plastics material is a polyamide in which at least 20 percent by weight glass fibres are embedded as reinforcement, while the second plastics material is the same polyamide but has a maximum of 10 percent by weight glass fibres, and especially has no fibre reinforcement.

The expansion elements are preferably bonded to the expander body. The bonded connections between the expansion elements and the expander body form the predetermined breaking points between the expansion elements and the expander body. "Bonded" means that the predetermined breaking points at which the expansion elements are joined to the expander body are formed by a bonded connection. In particular, the bonded connection is formed directly during production of the expander body and/or the expansion elements. Preferably the bonded connection is created by local welding by fusion of the expansion elements and/or the expander body during the production of the expansible fixing plug. For example, first the expansion part is produced, especially together with the sleeve-like portion, especially in one piece from the second plastics material. Then the expander body made of the first plastics material is injection-moulded onto the expansion part, during which the first plastics material starts to melt the second plastics material, which especially has substantially the same melting temperature, with the result that the first and second plastics materials are locally bonded together. During that procedure the predetermined breaking points, that is to say the locations at which the expansion elements and the expander body are bonded together, are formed. An advantage of this way of producing the predetermined breaking points is that no additional adhesive needs to be used for joining, that is to say for forming the predetermined breaking points, and accordingly no additional process step is necessary, but the expander body and the expansion elements can nevertheless consist of different plastics materials or of differently reinforced plastics materials.

Furthermore, the interlocking elements, which likewise consist of the second plastics material, can, in addition to their being interlockingly connected to the expander body, also be bonded thereto, and likewise by being welded by fusion during the production of the expansible fixing plug.

In order to limit a rotation angle of the expander body in relation to the expansion part during screwing-in of the expander screw to, for example, about 90° or about 180°, the expansible fixing plug especially has a rotation angle limiter for the expander body in relation to the expansion part. The rotation angle limiter can consist, for example, of a rotation stop.

For expansion of the expansion elements, a sloping spiral surface can be formed on the expander body as expander surface. "Sloping" means that generatrices of the expander surface run at an angle with respect to the longitudinal axis of the expansible fixing plug. The generatrices of the expander surface need not be straight lines; the expander surface can also be convex, concave, corrugated, etc. At the same time, the expander surface of the expander body can be a spiral surface, that is to say can run in a circumferential direction and radially from the longitudinal axis from inside to outside. By implementation of an expander surface of the expander body in the form of a sloping spiral surface, the expander body expands the expansion elements by movement of the expander body between the expansion elements and/or by rotation of the expander body between the expansion elements. "Between the expansion elements" means that in all cases the expander surface of the expander body is located at least partly between the expansion elements; the other parts of the expander body can also be located outside the expansion elements.

For thread engagement of an expander screw, a counter-bearing part can be arranged on the expander body. The counter-bearing part is especially a part produced separately from the rest of the expander body and arranged on the expander body. It especially has a through-opening for the expander screw. Cantilever-like counter-bearing elements for thread engagement with the external thread of the expander screw project into the through-opening, with the result that greater adaptation to different screw diameters and/or screw threads is possible than with a circular hole rim. For example, it is equally possible for a wood screw thread or for a machine thread to be screwed into the through-opening with the cantilever-like counter-bearing elements. In particular, the counter-bearing part is in the form of a stamped sheet metal part which has especially been interlockingly overmoulded by the first plastics material during production of the expander body or joined to the expander body after injection-moulding of the expander body.

BRIEF DESCRIPTION OF THE DRAWINGS

The invention is explained in greater detail below with reference to an exemplary embodiment shown in the drawings, wherein.

DETAILED DESCRIPTION OF THE INVENTION

Figure 1:
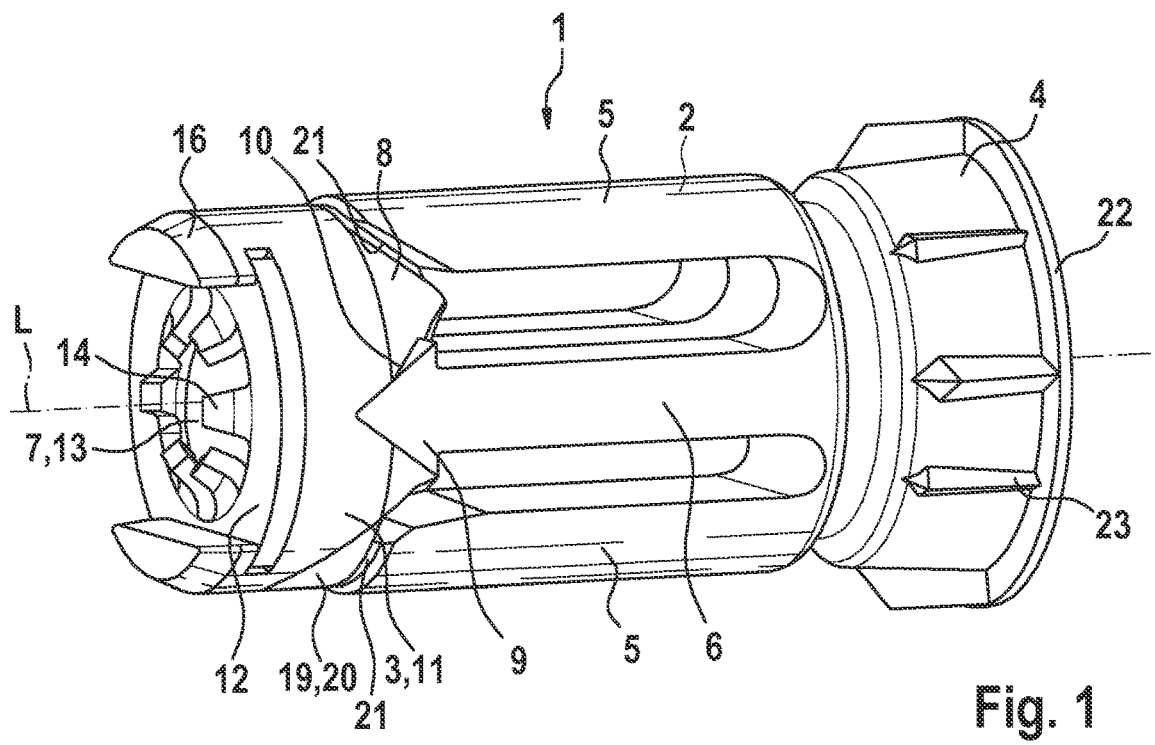
FIG. 1 is a perspective view of an expansible fixing plug according to the invention in a non-expanded state.

The expansible fixing plug 1 according to the invention shown in the drawing has an expansion part 2 and an expander body 3. The expansion part 2 consists of a plastics material, which in the exemplary embodiment is a polyamide, referred to hereinbelow as the "second plastics material". The expansion part 2 is adjoined by a sleeve-like portion 4, which can be thought of as annular or tubular, which portion forms the rear part of the expansible fixing plug 1. At its rear end the sleeve-like portion 4 has a circumferential collar 22 and anti-rotation ribs 23.

Expansion elements 5 of the expansion part 2 are articulatedly connected to the sleeve-like portion 4. These strip-like expansion elements 5 project forwards from the sleeve-like portion 4 on the circumference and parallel to the longitudinal axis L, as do also bar-like connecting elements 6. In the exemplary embodiment, the expansion part 2 of the expansible fixing plug 1 has two expansion elements 5 and two connecting elements 6 which are arranged opposite one another in each case, so that the connecting elements 6 are located between the expansion elements 5 on the circumference of the expansible fixing plug 1. At their rear ends remote from the expander body 3 both the expansion elements 5 and the connecting elements 6 merge integrally into the sleeve-like portion 4 with which they have been produced in one piece from the second plastics material in an injection-moulding process.

The expander body 3 is arranged coaxially with the expansion part 2, at those ends of the expansion elements 5 and the connecting elements 6 which are close thereto and are therefore remote from the sleeve-like portion 4. The expander body 3 is located partly between the expansion elements 5 and partly axially outside the expansion elements 5. The expander body 3 has an axial through-hole 7 which is concentric with a through-hole of the sleeve-like portion 4 of the expansion part 2, but has a smaller diameter and, like the through-opening, forms part of a screw channel for an expander screw 15. At an end face that faces towards the sleeve-like portion 4 of the expansion part 2, the expander body 3 has two sloping spiral surfaces as expander surfaces 8 which each extend over less than 180° in the circumferential direction. The sloping spiral surfaces can be thought of as frustoconical surfaces the radius of which increases in a circumferential direction. As a result of their sloping with respect to the longitudinal axis L, the expander surfaces 8 of the expander body 3 press the expansion elements 5 of the expansion part 2 apart from one another when the expander body 3 is moved between the expansion elements 5. As a result of their spiral shape, that is to say as a result of the increase in their radii in the one circumferential direction, the expander surfaces 8 of the expander body 3 also press the expansion elements 5 of the expansion part 2 apart from one another when the expander body 3 is rotated in relation to the expansion part 2 and the expander surfaces 8 are located between the expansion elements 5. The pressing-apart of the expansion elements 5 can also be referred to as expansion of the expansion elements 5 or of the expansible fixing plug 1. The expansion elements 5 can therefore be expanded both by movement of the expander body 3 between them and by rotation of the expander body 3 between them and also by a combination of both movements.

The expander body 3, the expansion part 2 and the sleeve-like portion 4 all consist of the same polyamide. However, the expander body 3 has a fibre reinforcement of 30 percent by weight glass fibres in the plastics material matrix. That reinforced polyamide of the expander body 3 is referred to hereinbelow as the "first plastics material", whereas, as already mentioned, the non-reinforced polyamide, from which the expansion part and the sleeve-like portion 4 are made, are referred to as the "second plastics material".

Between the expander body 3 and the front ends of the expansion elements 5 that face towards the expander body 3 there are located in the non-expanded state predetermined breaking points 21 at which the expansion elements 5 are integrally bonded to the expander body 3. The predetermined breaking points 21 are planar and run at an angle to the longitudinal axis L. The predetermined breaking points 21 have been formed during injection-moulding of the expansible fixing plug 1 by injection-moulding of the expander body 3 onto the expansion elements 5. Since the two plastics materials have substantially the same melting temperature, during injection-moulding of the expander body 3 the previously injection-moulded expansion elements 5 undergo local melting at their front ends. As a result of its having substantially the same melting temperature, the second plastics material at the front ends of the expansion parts 5 is heated by the injected first plastics material to such an extent that the two plastics materials become joined to one another, so that a bonded connection site, the predetermined breaking point 21, is formed. In the non-expanded state, the sleeve-like portion 4 is integrally and securely joined to the expander body 3 via the expansion elements 5 and the connecting elements 6, so that the expansible fixing plug 1 is also sufficiently stable to be inserted into a narrow drilled hole 18 (FIG. 2).

At their ends that face towards the expander body 3 the connecting elements 6 have interlocking elements 9 which, seen radially with respect to the expansible fixing plug 1 onto the circumferential surface thereof, have the shape of arrowheads the base surface of which faces towards the sleeve-like portion 4. The interlocking elements 9 of the connecting elements 6 are held in complementary recesses 10 on a circumference of the expander body 3 so that the connecting elements 6 join the expander body 3 to the expansion part 2 by means of their interlocking elements 9. The interlocking elements 9 of the connecting elements 6 and the complementary recesses 10 interlockingly join the connecting elements 6 to the expander body 3. As a result of the expander body 3 being injection-moulded onto the connecting elements 6, the interlocking elements 9 are additionally bonded to the expander body 3 by local welding by fusion when the interlocking elements 9 are overmoulded with the first plastics material from which the expander body 3 is made.

Figure 2:
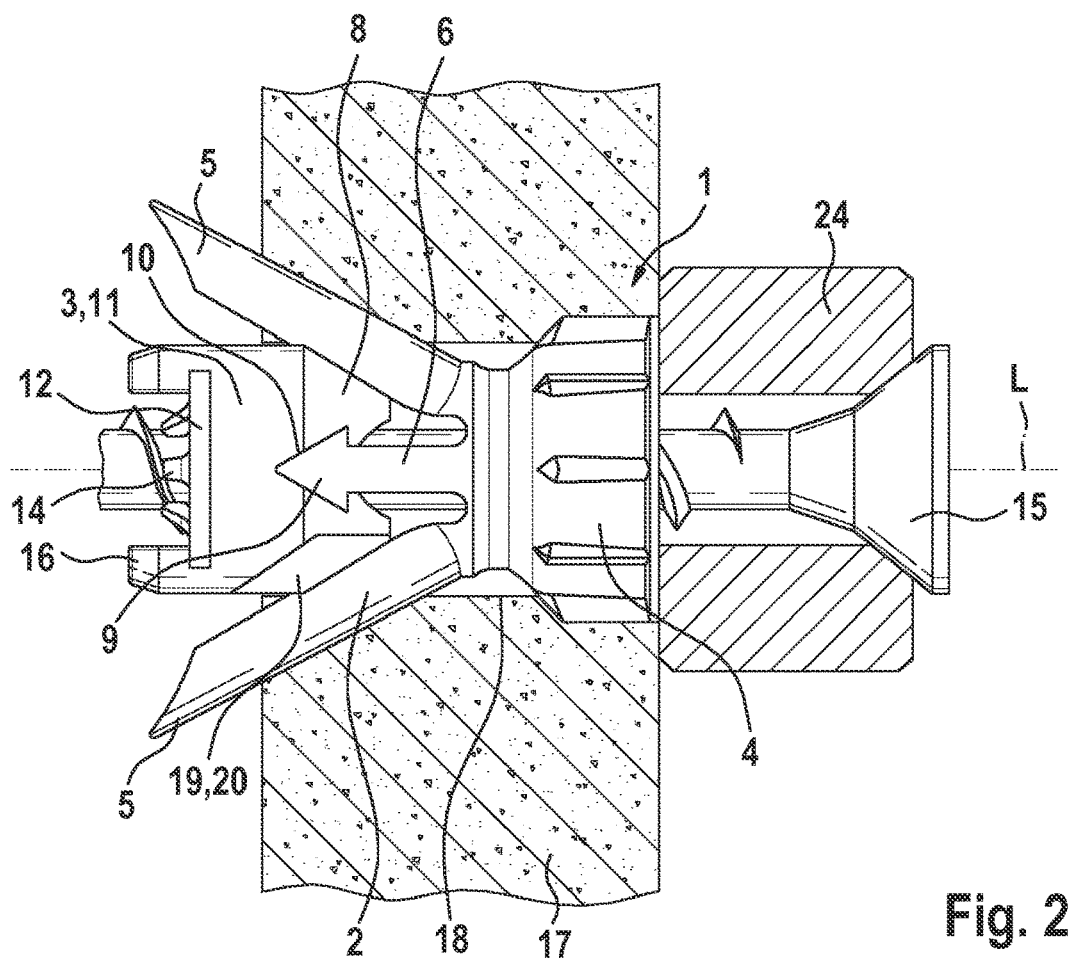
FIG. 2 is a side view of the expansible fixing plug from FIG. 1 expanded in a drilled hole.

When, as shown in FIG. 2, the expander body 3 is moved between the expansion elements 5 by means of an expander screw 15, the connecting elements 6 can be axially compressed, as shown in the drawing, and/or, differently from what is shown in the drawing, can buckle or bend outwards or in the circumferential direction. On rotation of the expander body 3 in relation to the expansion part 2, the connecting elements 6 are deformed in an S-shape or helically. Combinations of such deformations or some other form of deformation of the connecting elements 6 are also possible. As a result of the interlocking connection, however, the connecting elements 6 and the expander body 3 remain securely connected to one another even in that deformed state.

In order to limit rotation of the expander body 3 in relation to the expansion part 2, the expander body 3 has, in the region of its expander surfaces 8, two stop faces 19 that are arranged opposite one another in an axial plane of the expander body 3, which stop faces, seen radially onto the expander body 3 from one side, are opposed to one another and accordingly, seen in the circumferential direction, are oriented in the same circumferential direction. On rotation of the expander body 3 in relation to the expansion part 2, the stop faces 19 strike against the connecting elements 6 or against the expansion elements 5 and thereby limit a rotation angle of the expander body 3 in relation to the expansion part 2 to about 90°. The stop faces 19 can also be thought of as a rotation stop 20. They limit a rotation angle of the expander body 3 in relation to the expansion part 2 so that, on rotation of the expander body 3 between the expansion elements 5, the expander surfaces 8 spread the expansion elements 5 apart to a maximum extent.

A side of the expander surfaces 8 of the expander body 3 that faces away from the sleeve-like portion 4 is adjoined by a cylindrical portion 11, on the radial end face of which that faces away from the sleeve-like portion 4 of the expansion part 2 there is arranged a counter-bearing part 12. The counter-bearing part 12 is an apertured disc stamped from sheet metal, having a hole 13 into which the cantilever-like counter-bearing elements 14 project. The radially inwardly located counter-bearing elements 14 curve towards the inside and away from the sleeve-like portion 4 towards the front. As a result of the counter-bearing elements 14, the counter-bearing part 12 is able to adapt to different screw diameters and different forms of thread of an expander screw 15. It is equally possible to use, for example, a wood screw or a machine screw as expander screw 15.

The counter-bearing part 12 is held between two lugs 16 which, opposite one another and axially parallel on a circumference, project from the end face of the expander body 3 that faces away from the sleeve-like portion 4, which lugs have slots on their mutually facing inner sides, in which the apertured disc forming the counter-bearing part 12 is installed.

For fixing an add-on part 24 (FIG. 2) to or in a fixing substrate, here a plasterboard panel 17, the expansible fixing plug 1, as can be seen in FIG. 2, is introduced into a through-bore, which is here referred to as drilled hole 18, so that the expander body 3 and the free ends of the expansion elements 5 emerge from the panel 17 on a rear side and the expansion part 2 is countersunk in the drilled hole 18 flush with a front side of the panel 17, the insertion of the expansible fixing plug 1 into the drilled hole 18 being limited by the collar 22. For expansion, an expander screw 15 is inserted through the sleeve-like portion 4 and between the expansion elements 5 and the connecting elements 6 of the expansion part 2 into the axial through-hole 7 of the expander body 3 and screwed into and through the expander body 3 and the counter-bearing part 12 thereof. A screw thread of the expander screw 15 can be cut into the through-hole 7 of the expander body 3. A diameter of the through-opening of the sleeve-like portion 4 is larger than the diameter of the through-hole 7 of the expander body 3, so that the thread of the expander screw 15 is not cut into the through-opening of the sleeve-like portion 4. Independently of a thread engagement of the expander screw 15 in the through-hole 7 of the expander body 3, the screw thread of the expander screw 15 enters into engagement with the counter-bearing elements 14 of the counter-bearing part 12. By rotation, the expander screw 15 draws the expander body 3 between the expansion elements 5, so that the expander body 3 presses the expansion elements 5 apart from one another with its expander surfaces 8, that is to say it expands the expansion elements. The expansion can also be effected by rotation of the expander body 3 with the expander screw 15, the expansion elements 5 becoming detached from the expander body 3 at the predetermined breaking points 21, so that the predetermined breaking points 21 do not impede expansion. Since the predetermined breaking points 21 constitute only a bonded connection, separation at a precisely defined location with a specified force is possible.

The expansion causes the expansible fixing plug 1 to be anchored in the anchoring hole 18. In FIG. 2 the expanded expansion elements 5 engage behind the plasterboard panel 17 on its rear side.

If the expander screw 15 is screwed out of the expanded expansible fixing plug 1, the connecting elements 6 extend in approximately their original axially parallel direction again and hold the expander body 3 axially or at least approximately axially against the expansion part 2. The connecting elements 6 hold the expander body 3 oriented on the expansion part 2 in such a way that an expander screw 15 that is again passed through the sleeve-like portion 4 and between the expansion elements 5 and the connecting elements 6 of the expansion part 2 enters the axial through-hole 7 of the expander body 3 and can be screwed in and tightened to expand the expansion elements 5 or the expansible fixing plug 1.

LIST OF REFERENCE SYMBOLS

Expansible Fixing Plug

1 expansible fixing plug
2 expansion part
3 expander body
4 sleeve-like portion
5 expansion element
6 connecting element
7 through-hole of the expander body 3
8 expander surface
9 interlocking element
10 recess
11 cylindrical portion
12 counter-bearing part
13 hole
14 counter-bearing element
15 expander screw
16 lug
17 plasterboard panel
18 drilled hole
19 stop face
20 rotation stop
21 predetermined breaking point
22 collar
23 anti-rotation rib
24 add-on part
L longitudinal axis

The invention claimed is:

1. An expansible fixing plug, having a sleeve portion, an expander body, and an expansion part which is arranged between the sleeve portion and the expander body, which expansion part has expansion elements which, in a non-expanded state, are integrally joined to the sleeve portion and to the expander body,
wherein the expander body is movable towards the sleeve portion by means of an expander screw, with the result that the expander body expands the expansion part in such a way that, on expansion, the expansion elements become detached from the expander body at predetermined breaking points in such a way that, in an expanded state, they are separate from the expander body,
wherein the expansion part has connecting elements which integrally join the sleeve portion and the expander body in the non-expanded state and also in the expanded state,
wherein
the connecting elements are interlockingly connected to the expander body.

2. The expansible fixing plug according to claim 1, wherein the connecting elements, at their ends that face towards the expander body, each have at least one interlocking element which engages interlockingly in the expander body.

3. The expansible fixing plug according to claim 2, wherein the interlocking element is of wedge configuration, with a tip that faces away from the sleeve portion.

4. The expansible fixing plug according to claim 1, wherein the expander body consists of a first plastics material, and the expansion part is made from a second plastics material.

5. The expansible fixing plug according to claim 4, wherein the first plastics material is fibre-reinforced.

6. The expansible fixing plug according to claim 4, wherein the first plastics material has substantially the same melting temperature as the second plastics material.

7. The expansible fixing plug according to claim 4, wherein the two plastics materials are polyamides.

8. The expansible fixing plug according to claim 1, wherein the expansion elements are bonded to the expander body.

9. The expansible fixing plug according to claim 8, wherein the bonded connection is created by local welding by fusion of the expansion elements and/or the expander body during the production of the expansible fixing plug.

10. The expansible fixing plug according to claim 8, wherein the bonded connections between the expansion elements and the expander body form the predetermined breaking points between the expansion elements and the expander body.

* * * * *